(12) United States Patent
Uwabo et al.

(10) Patent No.: US 6,239,950 B1
(45) Date of Patent: May 29, 2001

(54) HIGH DENSITY FLEXIBLE DISK DRIVE HAVING A LARGE CAPACITY DETECTING SWITCH PROVIDED AT A POSITION CORRESPONDING TO A LARGE CAPACITY IDENTIFIER HOLE PROVIDED IN A CASE OF A LARGE CAPACITY FLEXIBLE DISK

(75) Inventors: Tsuneo Uwabo, Hachiouji; Yoshihiro Okano; Eiichi Yoneyama, both of Atsugi, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/338,859

(22) Filed: Jun. 23, 1999

Related U.S. Application Data

(62) Division of application No. 08/854,983, filed on May 13, 1997, now Pat. No. 5,940,255.

(30) Foreign Application Priority Data

| Mar. 26, 1996 | (JP) | 8-165604 |
| May 14, 1996 | (JP) | 8-118619 |
| May 17, 1996 | (JP) | 8-123140 |

(51) Int. Cl.[7] ............................. G11B 23/03; G11B 15/04
(52) U.S. Cl. ........................................... 360/133; 360/60
(58) Field of Search ................................. 360/60, 133, 69; 369/291

(56) References Cited

U.S. PATENT DOCUMENTS

| 4,995,029 | * | 2/1991 | Kobayahi et al. | 369/291 |
| 5,173,816 | * | 12/1992 | Ogihara | 360/133 X |
| 5,499,233 | * | 3/1996 | Childers et al. | 369/291 |
| 5,548,571 | * | 8/1996 | Mistretta | 369/133 X |
| 5,629,819 | * | 5/1997 | Kitano | 360/99.02 |
| 5,638,228 | * | 6/1997 | Thomas | 360/60 |
| 5,680,284 | * | 10/1997 | Oishi | 360/133 |
| 5,748,420 | * | 5/1998 | Ko et al. | 360/133 |

\* cited by examiner

*Primary Examiner*—David L. Ometz
(74) *Attorney, Agent, or Firm*—Frishauf, Holtz, Goodman, Langer & Chick, P.C.

(57) ABSTRACT

A high-density flexible disk drive capable of accessing a large-capacity flexible disk is provided with a large-capacity detecting switch. The large-capacity flexible disk has a case accommodating a magnetic disk medium, with the case being provided with a write protection hole and a single large-capacity identifier hole formed in a vicinity of the write protection hole for distinguishing the large-capacity flexible disk from a small-capacity and a medium-capacity flexible disk. The large-capacity detecting switch of the high-density flexible disk drive is provided at a position corresponding to the large-capacity identifier hole for detecting the large-capacity identifier hole when the large-capacity flexible disk is inserted into the high-density flexible disk drive. In a preferred embodiment, the large-capacity detecting switch is integrally formed in a single unit with a write control switch for detecting open and close states of the write protection hole.

1 Claim, 12 Drawing Sheets

HIGH DENSITY FLEXIBLE DISK DRIVE HAVING A LARGE CAPACITY DETECTING SWITCH PROVIDED AT A POSITION CORRESPONDING TO A LARGE CAPACITY IDENTIFIER HOLE PROVIDED IN A CASE OF A LARGE CAPACITY FLEXIBLE DISK

This is a division of application Ser. No. 08/854,983, filed on May 13, 1997, now U.S. Pat. No. 5,940,255.

BACKGROUND OF THE INVENTION

This invention relates to a large-capacity flexible disk and a high-density type disk drive capable of accessing a large-capacity Flexible disk and, in particular, to a high-density type disk drive capable of discriminating a large-capacity flexible disk from other flexible disks.

As well known, a flexible disk drive is a device for recording and reproducing data to and from flexible disks. As also well known, there are various flexible disks having different storage capacities. In the following description, those flexible disks having storage capacities of 1 Mbyte, 2 Mbyte, and 4 Mbyte will collectively be called small-capacity flexible disks while those flexible disks having storage capacities of 10 Mbyte and 21 Mbyte will collectively be called medium-capacity flexible disks.

In recent years, flexible disks have been improved to have much greater capacities. In comparison with the small-capacity and the medium-capacity flexible disks mentioned above, those flexible disks (hereinafter collectively called large-capacity flexible disks) having storage capacities of 128 Mbyte, 256 Mbyte, and 512 Mbyte, . . . are being developed.

In the following, a flexible disk drive capable of recording and reproducing data to and from the large-capacity flexible disks alone will be called a dedicated high-density flexible disk drive. A flexible disk drive capable of recording and reproducing data to and from the medium-capacity flexible disks alone will be called a dedicated medium-density flexible disk drive. A flexible disk drive capable of recording and reproducing data to and from the small-capacity flexible disks alone will be called a dedicated low-density flexible disk drive. Furthermore, a flexible disk drive capable of recording and reproducing data to and from all of the large-capacity, the medium-capacity, and the small-capacity flexible disks will be called a universal multi-density flexible disk drive. In addition, the dedicated high-density flexible disk drive and the universal multi-density flexible disk drive will collectively called a high-density type flexible disk drive.

One of the differences in mechanism between the dedicated low-density flexible disk drive and the high-density type flexible disk drive resides in the structure of a driving means for moving a carriage holding a magnetic head in a predetermined radial direction with respect to a flexible disk inserted in the drive. Specifically, the dedicated low-density flexible disk drive uses a stepping motor as the driving means while the high-density flexible disk drive uses a linear motor, such as a voice coil motor (VCM), as the driving means.

Next, description will be made in more detail about the voice coil motor used as the driving means of the high-density type flexible disk drive. The voice coil motor comprises a voice coil located on opposite sides of a rear portion of the carriage and wound around a drive shaft parallel to the predetermined radial direction, and a magnetic circuit for producing a magnetic field intersecting an electric current flowing through the voice coil. With this structure, by flowing the electric current through the voice coil in a direction intersecting the magnetic field produced by the magnetic circuit, driving force is produced in an extending direction of the drive shaft as a result of interaction between the electric current and the magnetic field. Due to the driving force, the voice coil motor moves the carriage in the predetermined radial direction.

Conventional large-capacity flexible disks are identical in external shape with the small-capacity and the medium-capacity flexible disks. For all of these types, 3.5-inch disks have a flat rectangular shape having a width, a length, and a thickness of 90 mm, 94 mm, and 3.3 mm, respectively.

As well known, the small-capacity flexible disks are classified into three types having storage capacities of 1 Mbyte, 2 Mbyte, and 4 Mbyte, respectively. For convenience of description, the small-capacity flexible disks having storage capacities of 1 Mbyte, 2 Mbyte, and 4 Mbyte are called small-capacity (1 M) flexible disks, small-capacity (2 M) flexible disks, and small-capacity (4 M) flexible disks, respectively.

In the dedicated low-density flexible disk drive, it is required to identify the storage capacity of 1 Mbyte, 2 Mbyte, and 4 Mbyte small-capacity flexible disks inserted therein. For this purpose, a case of each of the small-capacity flexible disks of 2 Mbyte and 4 Mbyte is provided with a 2-Mbyte identifier hole or the like to discriminate between the small-capacity flexible disks of 1 Mbyte and the small-capacity flexible disks of both 2 Mbyte and 4 Mbyte.

Besides, there are a wide variety of flexible disks having different storage capacities. Accordingly, the flexible disk drives must identify the type of the flexible disk inserted therein. To this end, each conventional flexible disk is provided in a plane of the case with an identifier hole corresponding to the type. As the identifier hole, it is known to form various identifier holes, such as a 2-Mbyte identifier hole and a 4-Mbyte identifier hole, in the plane of the case. Identification is carried out with reference to the presence or absence of the identifier hole. With so many disks in use, however, identification of a large number of types of the flexible disks is approaching a limit. This is because, in order to form or perforate the identifier hole, an unperforated area is required around the identifier hole. As a result, a wide area is required.

SUMMARY OF THE INVENTION

It is therefore an object of this invention to provide large-capacity flexible disks which enable identification of a large number of types of storage capacities.

It is another object of this invention to provide large-capacity flexible disks which enable discrimination from normal-capacity flexible disks having a small capacity or a medium capacity.

It is still another object of this invention to provide large-capacity flexible disks which enable, even if there are a plurality of types of storage capacities, identification of the types.

It is a further object of this invention to provide a high-density type flexible disk drive having a mechanism capable of identifying small-capacity, medium-capacity, and large-capacity flexible disks.

It is a different object of this invention to provide a high-density type flexible disk drive having a mechanism capable of enabling identification of large-capacity flexible disks having a plurality of types of storage capacities.

According to this invention, there is provided a large-capacity flexible disk having a case accommodating a magnetic disk medium, wherein the case is provided with a single large-capacity identifier hole formed in the vicinity of a write protection hole to discriminate the large-capacity flexible disk from other flexible disks.

According to this invention, there is also provided a large-capacity flexible disk having a case accommodating a magnetic disk medium, wherein the case is provided with at least one large-capacity identifier notch formed at one lateral side edge to discriminate the large-capacity flexible disk from other flexible disks.

According to this invention, there is also provided a high-density type flexible disk drive capable of accessing a large-capacity flexible disk having a case accommodating a magnetic disk medium, the case being provided with a single large-capacity identifier hole formed in the vicinity of a write protection hole to discriminate the large-capacity flexible disk from a small-capacity or a medium-capacity flexible disk, which is characterized by provision of a large-capacity identifier switch at a position corresponding to the large-capacity identifier hole.

According to this invention, there is also provided a high-density type flexible disk drive capable of accessing a large-capacity flexible disk having a case accommodating a magnetic disk medium, the case being provided with large-capacity identifying and discriminating means for discriminating the large-capacity flexible disk from a normal-capacity flexible disk, which is characterized by provision of large-capacity detecting means at a position corresponding to the large-capacity identifying and discriminating means.

DESCRIPTION OF PREFERRED EMBODIMENTS

Prior to description of embodiments of this invention, prior art flexible disks will be described in order to facilitate an understanding of this invention.

Figure 1A:
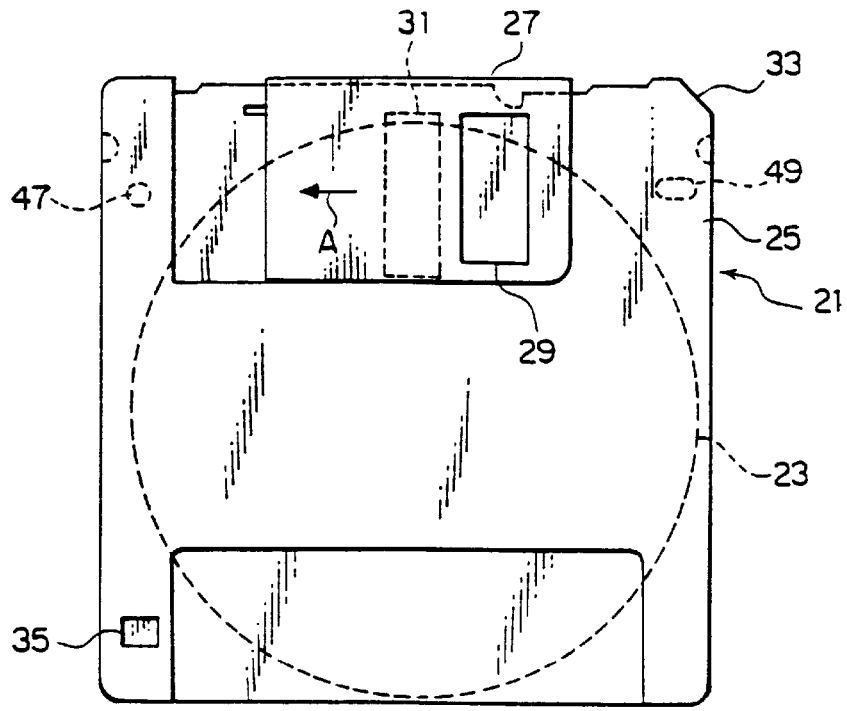
FIG. 1A is a plan view of a conventional small-capacity (1 M) flexible disk as seen from a front surface side (called a side 1)
Figure 1B:
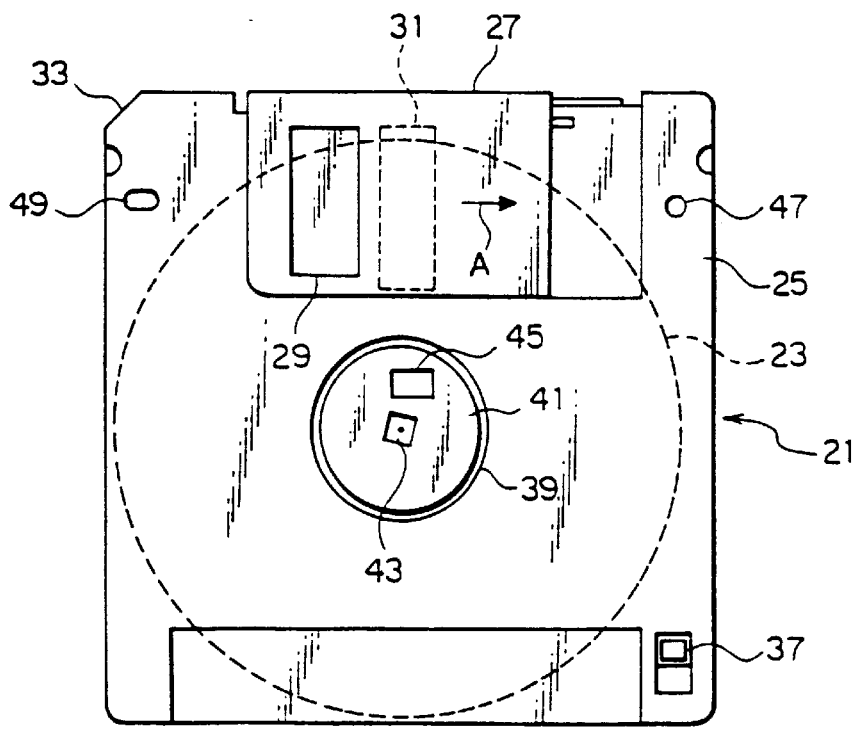
FIG. 1B is a bottom view of the small-capacity (1 M) flexible disk in FIG. 1A as seen from a rear surface side (called a side 0)

Referring to FIGS. 1A and 1B, description will be made about a structure of a conventional small-capacity flexible disk 21. The conventional small-capacity (1 M) flexible disk 21 comprises a disk-shaped magnetic disk medium 23, a case 25 covering the magnetic disk medium 23, and a shutter 27 slidable in a direction of an arrow A in the figures. A shutter window 29 is formed in the shutter 27.

The shutter 27 is urged by a spring member not illustrated in the figures in a direction reverse to the direction of the arrow A. When the shutter 27 slides in the direction of the arrow A, the shutter window 29 of the shutter 27 is located above a head window 31 of the case 25 so that the magnetic disk medium 23 is accessible through the head window 31 by a magnetic head (not shown) of a flexible disk drive.

The case 25 has a flat rectangular shape having a width, a length, and a thickness substantially equal to 90 mm, 94 mm, and 3.3 mm, respectively. The case 25 is provided with a chamfered portion 33 formed at a right corner of a forward end in an insertion direction to prevent reverse insertion (insertion with upside down and forward side back). A write protection hole (write inhibition hole) 35 is formed at a left side corner of a rearward end in the insertion direction.

As illustrated in FIG. 1B, a write protection tab 37 slidable in the insertion direction is formed on a rear surface (lower surface) of the case 25 at a position corresponding to the write protection hole 35. By manually operating the write protection tab 37, the write protection hole 35 can be opened and closed. When the write protection hole 35 is closed by the write protection tab 37, a recordable state is established. When the write protection hole 35 is opened, an unrecordable state is insured.

In a rear surface side (side 0) of the case 25, a circular-shaped hub operation hole 39 is formed at its center, as illustrated in FIG. 1B. In the hub operation hole 39, a disk hub 41 holding the magnetic disk medium 23 is loosely fitted. The disk hub 41 is provided with a disk center hole 43 formed at its center to loosely fit a spindle shaft (not shown) of a spindle motor, and a chucking hole 45 formed at a peripheral position offset from the disk center hole 43 to loosely fit a chucking pin (not shown) of the spindle motor.

Furthermore, in the rear surface side (side 0) of the case 25, first and second reference holes 47 and 49 are formed near opposite sides of a front portion in the insertion direction to be used for positioning, when the flexible disk 21 is inserted and received in the flexible disk drive (not shown), the flexible disk 21 in a height direction and in forward, backward, leftward, and rightward directions with respect to the flexible disk drive. The first reference hole 47 is a circular hole while the second reference hole 49 is an elongated hole extending in a direction perpendicular to the insertion direction.

In addition, in order to identify the type of the flexible disk 21, the case 25 of the flexible disk 21 is provided with an identifier hole formed in its plane in correspondence to a difference in storage capacity. Herein, the small-capacity flexible disk 21 having a storage capacity of 1 Mbyte is provided with no identifier hole.

On the other hand, a low-density flexible disk drive has a write control switch (not shown) formed at a position corresponding to the write protection hole 35 to detect open and close states of the write protection hole 35. In response to on/off conditions of the switch, permission/inhibition of writing operation to the small-capacity flexible disk 21 is carried out.

Next referring to FIGS. 2A and 2B, description will be made about a structure of a conventional small-capacity (2 M) flexible disk 51. The small-capacity (2 M) flexible disk 51 is inserted into a low-density flexible disk drive (not shown) in the state illustrated in FIG. 2A. Basically, the small-capacity (2 M) flexible disk 51 is similar in structure and external shape to the small-capacity (1 M) flexible disk 21 illustrated in FIGS. 1A and 1B. Specifically, the small-capacity (2 M) flexible disk 51 comprises a disk-shaped magnetic disk medium 53, a case 55 covering the magnetic disk medium 53, and a shutter 27 slidable in a direction of an arrow A in the figures. A shutter window 29 is formed in the shutter 27. The shutter 27 is urged by a spring member not illustrated in the figures in a direction reverse to the direction of the arrow A. When the shutter 27 slides in the direction of the arrow A, the shutter window 29 of the shutter 27 is located above a head window 31 formed in the case 55 as illustrated in FIGS. 2A and 2B so that the magnetic disk medium 53 is accessible through the head window 31 by a magnetic head (not shown) of the low-density flexible disk drive.

Like the case 25 of the above-mentioned small-capacity (1 M) flexible disk 21, the case 55 has a flat rectangular shape having a width, a length, and a thickness substantially equal to 90 mm, 94 mm, and 3.3 mm, respectively. The case 55 is provided with a chamfered portion 33 formed at a right corner of a forward end in an insertion direction to prevent reverse insertion (insertion with upside down and forward side back). A write protection hole 35 is formed at a left side corner of a rearward end in the insertion direction.

Figure 2A:
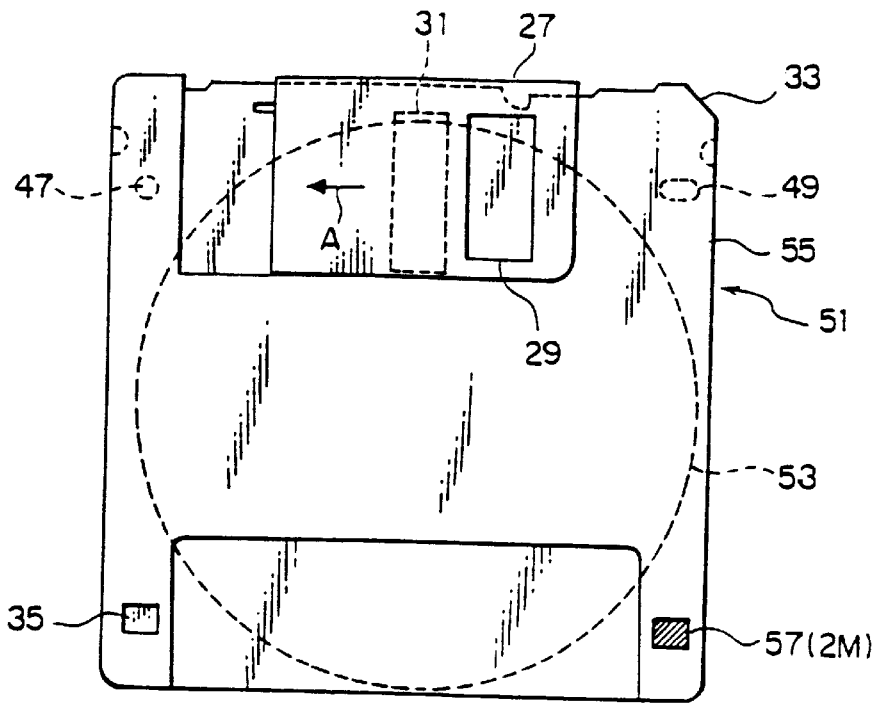
FIG. 2A is a plan view of a conventional small-capacity (2 M) flexible disk as seen from a front surface side.
Figure 2B:
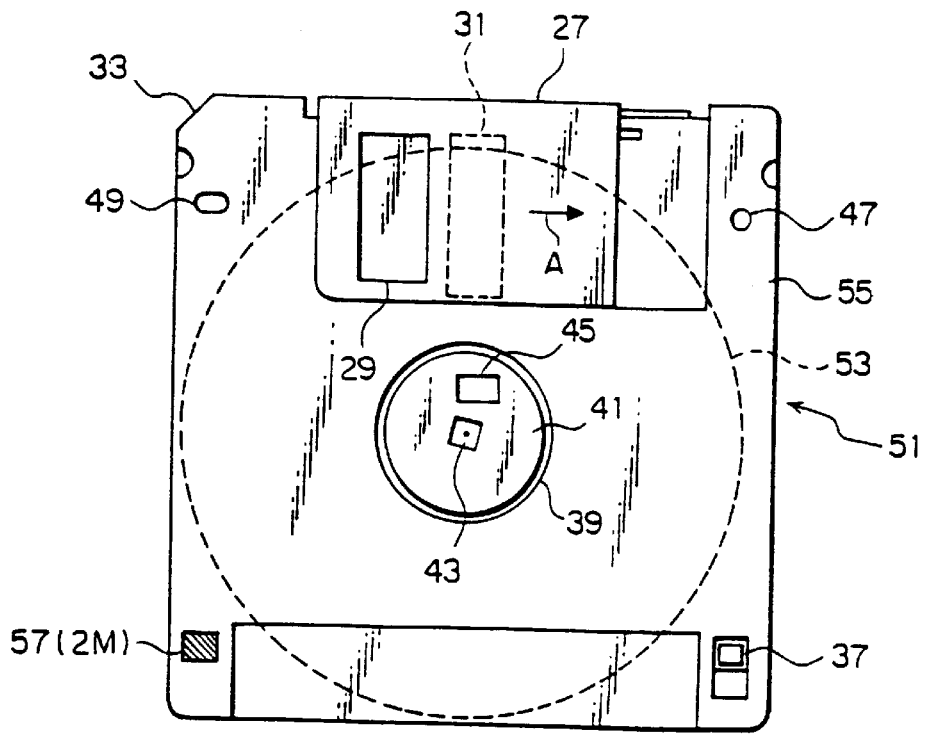
FIG. 2B is a bottom view of the small-capacity (2 M) flexible disk in FIG. 2A as seen from a rear surface side.

The case 55 of the flexible disk 51 having a storage capacity of 2 Mbyte illustrated in FIGS. 2A and 2B is different from the case 25 of the above-mentioned small-capacity (1 M) flexible disk 21 in that a 2-Mbyte identifier hole 57 (2 M) representative of the storage capacity of 2 Mbyte is formed in a penetrating state at a right side corner of the rearward end in the insertion direction.

On the other hand, the low-density flexible disk drive has a small-capacity detecting switch (not shown) formed at a position corresponding to the 2-Mbyte identifier hole 57 to identify and discriminate whether a storage capacity of an inserted flexible disk is equal to 1 Mbyte or 2 Mbyte. When the small-capacity detecting switch detects the presence of the 2-Mbyte identifier hole 57, the inserted flexible disk is identified as the small-capacity (2 M) flexible disk 53. Upon detection of absence of the 2-Mbyte identifier hole 57, the inserted flexible disk is identified as the small-capacity (1 M) flexible disk 21.

Figure 3A:
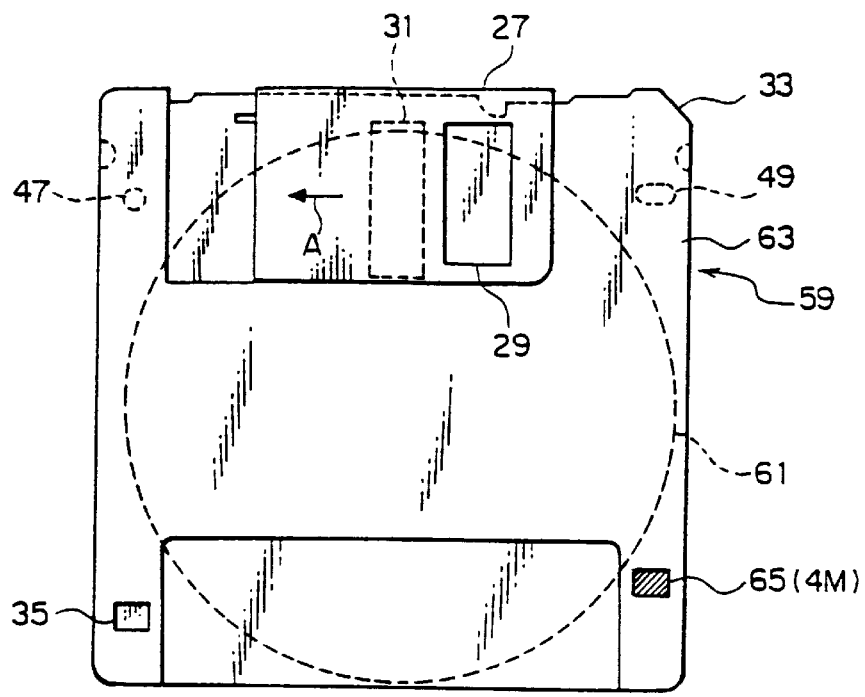
FIG. 3A is a plan view of a conventional small-capacity (4 M) flexible disk as seen from a front surface side.
Figure 3B:
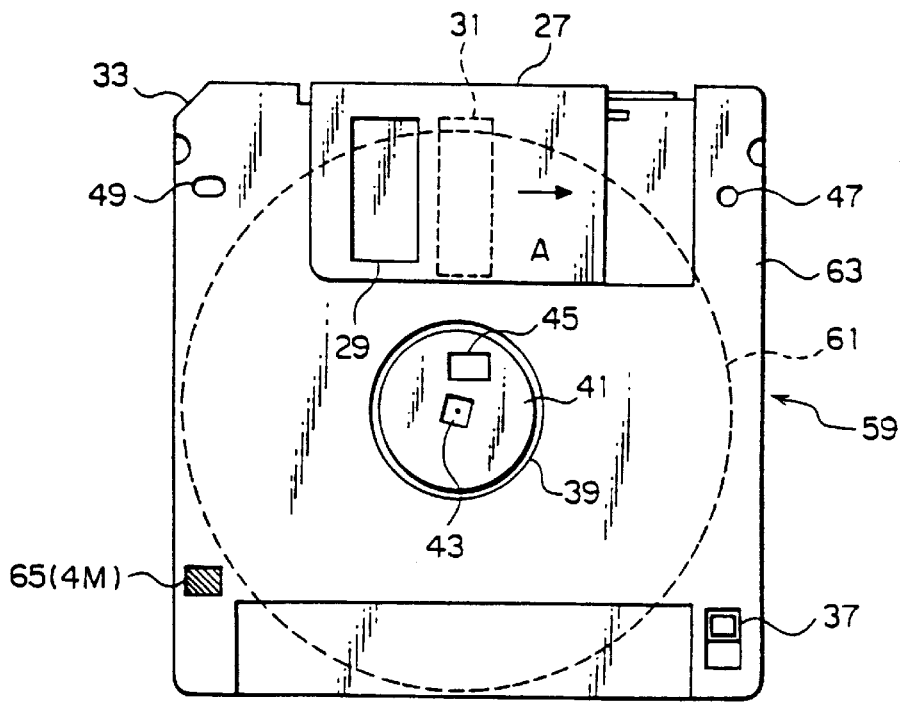
FIG. 3B is a bottom view of the small-capacity (4 M) flexible disk in FIG. 3A as seen from a rear surface side.

Referring to FIGS. 3A and 3B, a small-capacity (4 M) flexible disk 59 having a storage capacity of 4 Mbyte has a case 63 provided with a 4-Mbyte identifier hole 65 (4 M) representative of the storage capacity of 4 Mbyte formed in a penetrating state at a right side corner of a rearward end in an insertion direction and forward in the insertion direction from the position where the 2-Mbyte identifier hole 57 (2 M) is formed as illustrated in FIGS. 2A and 2B.

Figure 4A:
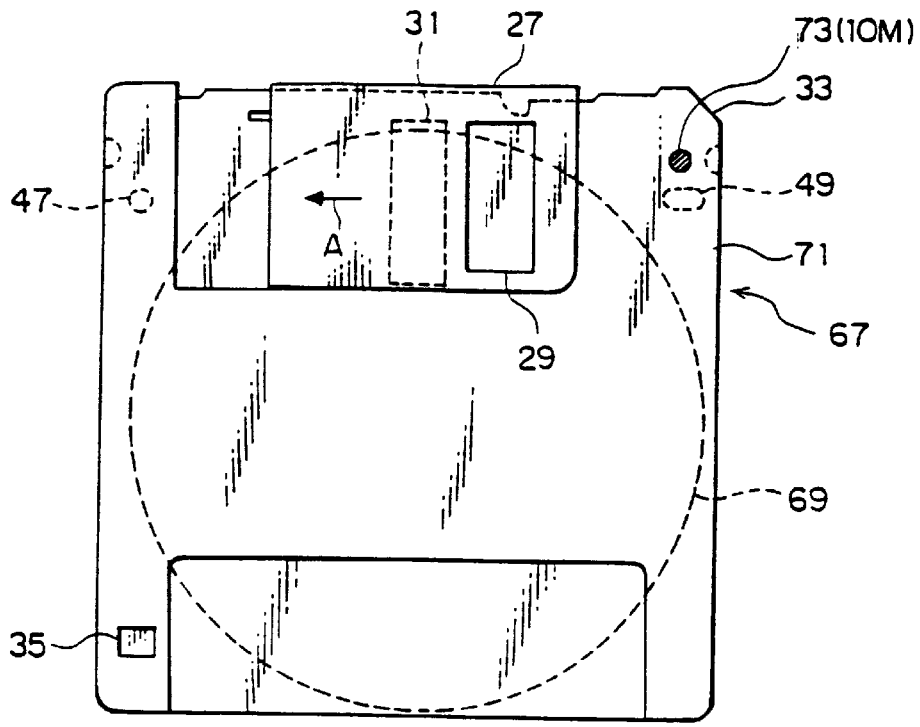
FIG. 4A is a plan view of a conventional medium-capacity (10 M) flexible disk as seen from a front surface side.
Figure 4B:
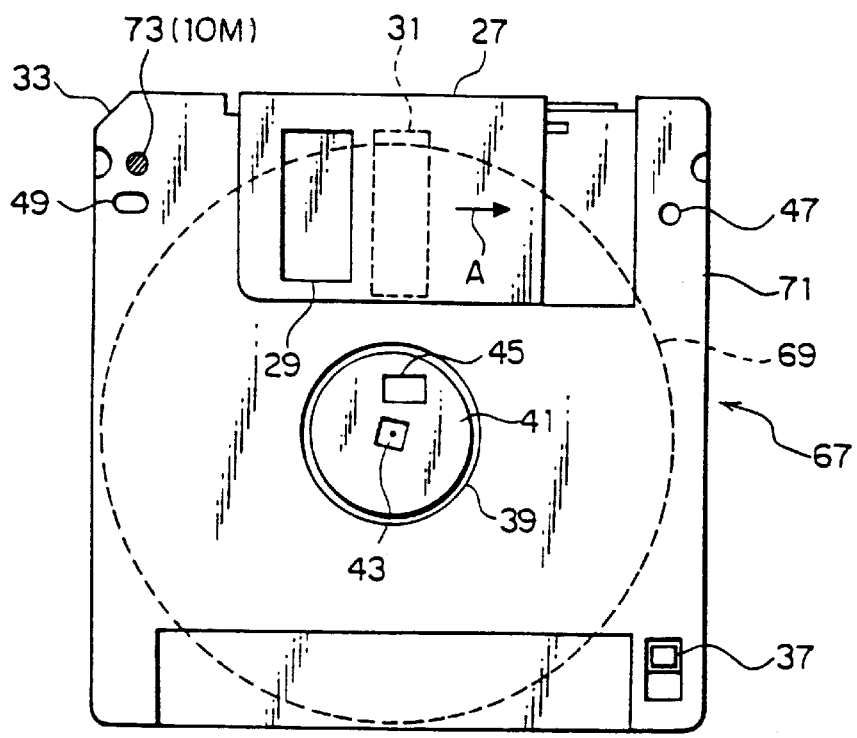
FIG. 4B is a bottom view of the medium-capacity (10 M) flexible disk in FIG. 4A as seen from a rear surface side.

Referring to FIGS. 4A and 4B, description will be made about an instance where a flexible disk is a medium-capacity flexible disk. The medium-capacity (10 M) flexible disk 67 having a storage capacity of 10 Mbyte has a case 71 which is not provided with the 2-Mbyte identifier hole 57 and the 4-Mbyte identifier hole 65 illustrated in FIGS. 2A, 2B, 3A, and 3B. Instead, a 10-Mbyte identifier hole 73 (10 M) representative of the storage capacity of 10 Mbyte is formed-in a penetrating state at a right corner of a forward end in an insertion direction in the vicinity of a reverse insertion preventing chamfered portion 33.

Figure 5A:
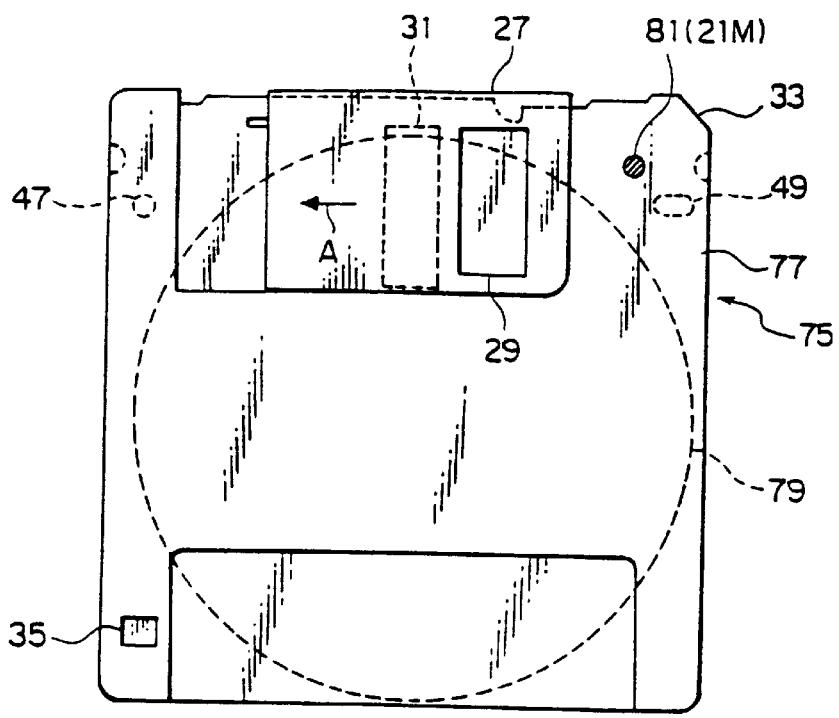
FIG. 5A is a plan view of a conventional medium-capacity (21 M) flexible disk as seen from a front surface side.
Figure 5B:
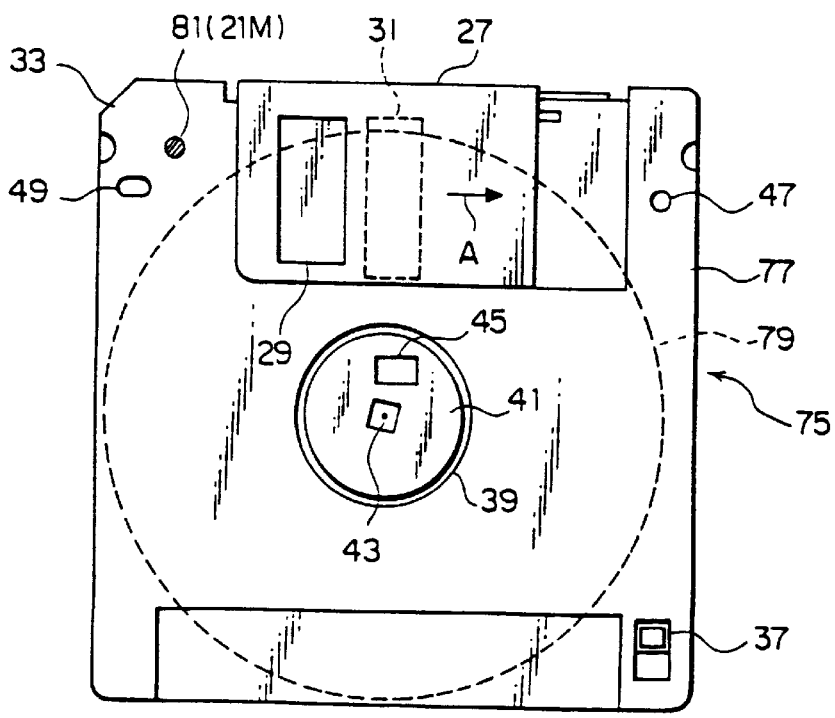
FIG. 5B is a bottom view of the medium-capacity (21 M) flexible disk in FIG. 5A as seen from a rear surface side.

Referring to FIGS. 5A and 5B, a medium-capacity (21 M) flexible disk 75 having a storage capacity of 21 Mbyte is similar in structure to the medium-capacity (10 M) flexible disk 67 illustrated in FIGS. 4A and 4B except that a case 77 is provided with a 21-Mbyte identifier hole 85 (21 M) representative of the storage capacity of 21 Mbyte formed in a penetrating state at a right corner of a forward end in the insertion direction and inward from the position where the 10-Mbyte identifier hole 73 (10 M) is formed as illustrated in FIGS. 4A and 4B.

Now, embodiments of this invention will be described with reference to the drawing.

Figure 6A:
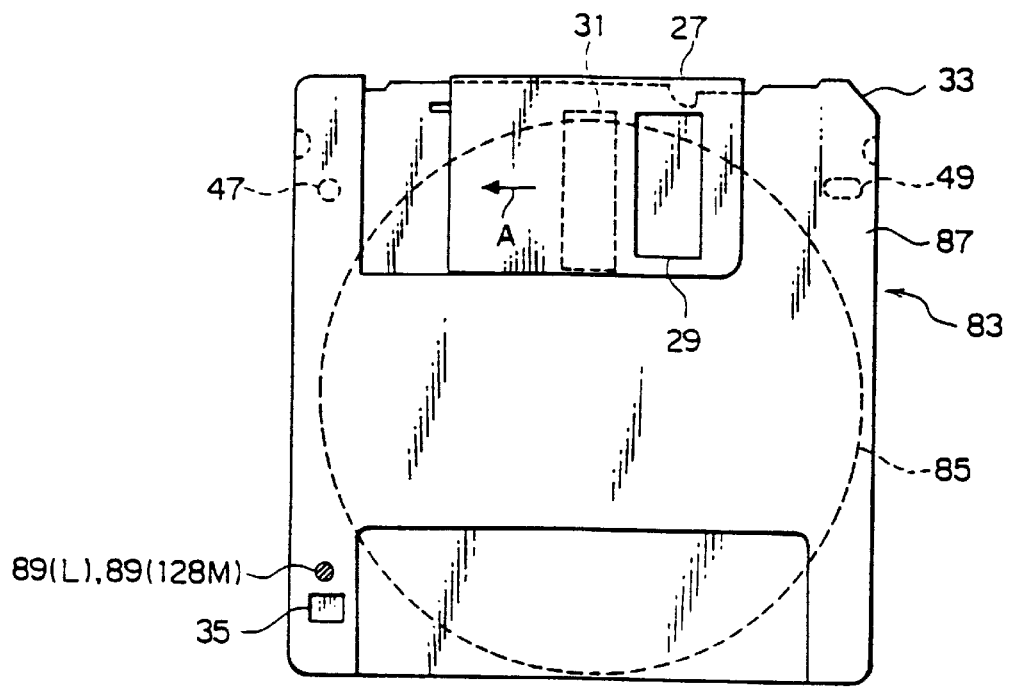
FIG. 6A is a plan view of a large-capacity (128 M) flexible disk according to a first embodiment of this invention as seen from a front surface side.
Figure 6B:
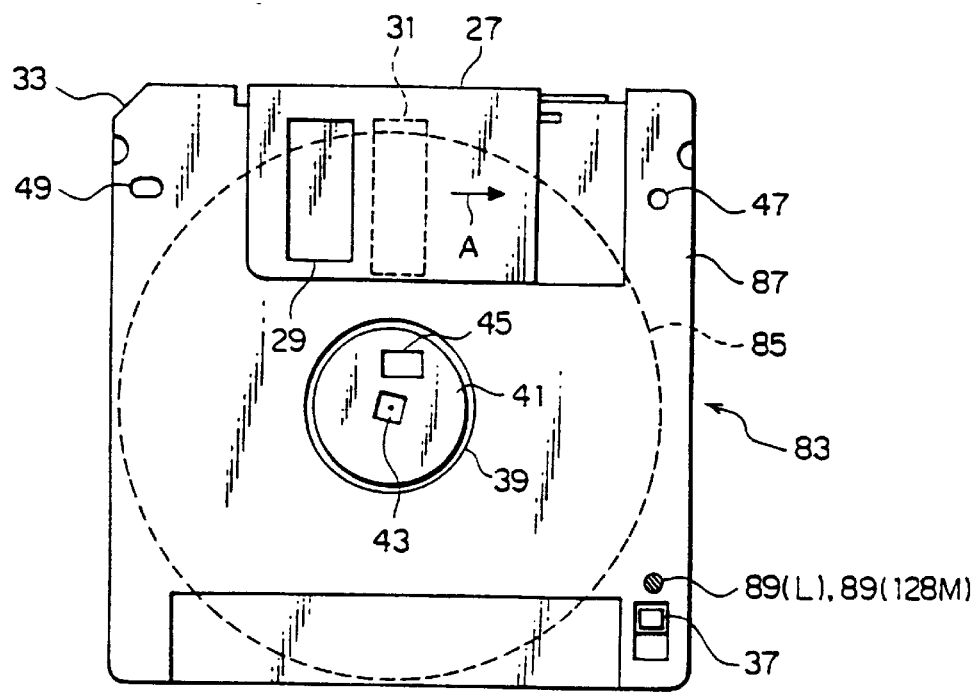
FIG. 6B is a bottom view of the large-capacity (128 M) flexible disk in FIG. 6A as seen from a rear surface side.

Referring to FIGS. 6A and 6B, description will be made about a large-capacity flexible disk according to a first embodiment of this invention.

FIG. 6A shows the large-capacity (128 M) flexible disk 83 in a state it is inserted into a high-density type flexible disk drive (not shown) and is directed to a situation where a single type of a storage capacity of 128 Mbyte is involved.

The large-capacity (128) flexible disk 83 according to the first embodiment of this invention comprises a disk-shaped magnetic disk medium 85, a case 87 covering the magnetic disk medium 85, and a shutter 27 slidable in a direction of an arrow A in the figures. A shutter window 29 is formed in the shutter 27. The shutter 27 is urged by a spring member not illustrated in the figures in a direction reverse to the direction of the arrow A. When the shutter 27 slides in the direction of the arrow A, the shutter window 29 of the shutter 27 is located above a head window 31 of the case 87 as illustrated in FIGS. 6A and 6B so that the magnetic disk medium 85 is accessible through the head window 31 by a magnetic head (not shown) of the high-density type flexible disk drive which will later be described.

The case 87 has a flat rectangular shape having a width, a length, and a thickness substantially equal to 90 mm, 94 mm, and 3.3 mm, respectively. The case 87 is provided with a chamfered portion 33 formed at a right corner of a forward end in an insertion direction to prevent reverse insertion (insertion with upside down and forward side back). A write protection hole 35 is formed at a left side corner of a rearward end in the insertion direction.

The above-described large-capacity flexible disk 83 according to the first embodiment of this invention is similar to the small-capacity flexible disk illustrated in FIGS. 1A and 1B except that the case 87 is provided with a large-capacity identifier hole 89 (L) or (128 M) formed in a penetrating state in the vicinity of the write protection hole 35 to discriminate the large-capacity flexible disk 83 from other flexible disks.

Specifically, the case 87 is provided with a single large-capacity identifier hole 89 to discriminate the large-capacity (128 M) flexible disk 83 from a small-capacity or a medium-capacity flexible disk. In the first embodiment, the large-capacity identifier hole 89 is formed in the vicinity of the write protection hole 35.

Although not shown, the high-density type flexible disk drive has a large-capacity detecting switch formed at a position corresponding to the above-mentioned large-capacity identifier hole 89 to identify and detect whether a flexible disk inserted therein is the large-capacity flexible disk 83 or a normal-capacity flexible disk. When the large-capacity detecting switch detects presence of the large-capacity identifier hole 89, the inserted flexible disk is identified as the large-capacity flexible disk 83. Upon detection of absence of the large-capacity identifier hole 89, the inserted flexible disk is identified as the small-capacity or the medium-capacity flexible disk. As the large-capacity detecting switch described above, use may be made of a push switch or an optical switch.

Figure 7A:
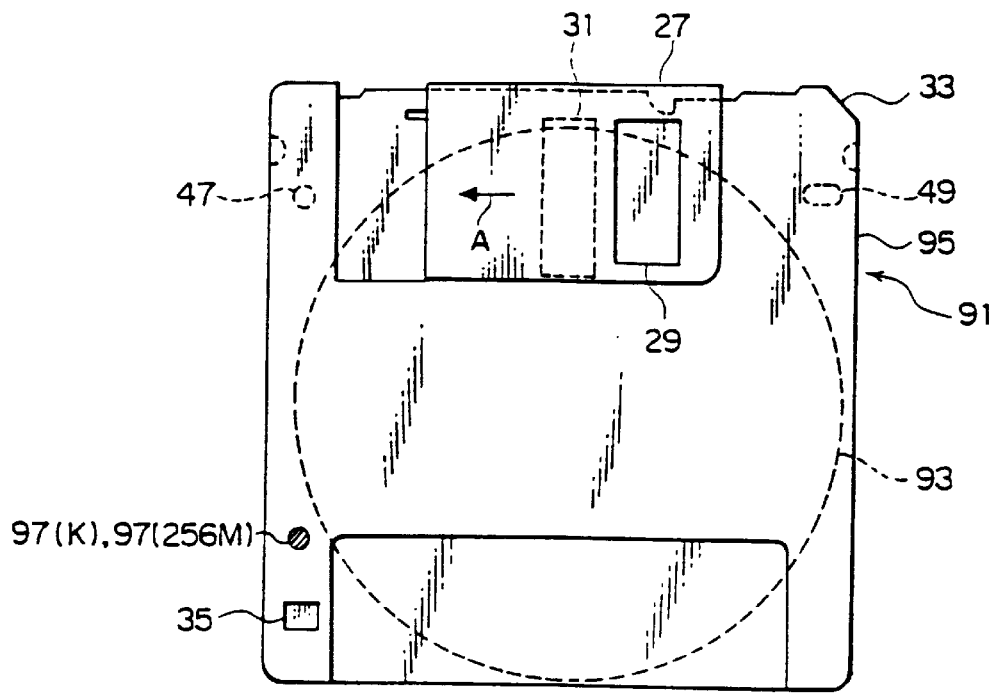
FIG. 7A is a plan view of a large-capacity (256 M) flexible disk according to a second embodiment of this invention as seen from a front surface side.
Figure 7B:
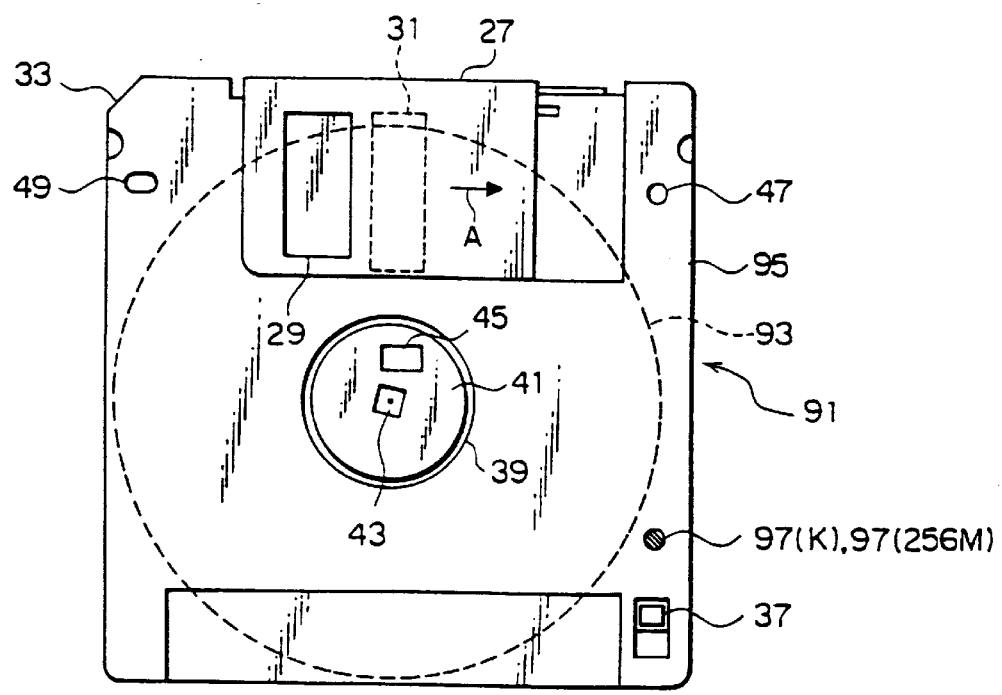
FIG. 7B is a bottom view of the large-capacity (256 M) flexible disk in FIG. 7A as seen from a rear surface side.

Referring to FIGS. 7A and 7B, a large-capacity (256 M) flexible disk 91 according to a second embodiment of this invention is similar in structure to the large-capacity flexible disk 83 illustrated in FIGS. 6A and 6B except that a storage capacity is a large capacity of 256 Mbyte and that, instead of the large-capacity identifier hole 89, a type identifier hole 97 is formed at a position different from that of the large-capacity identifier hole 89. Specifically, in the large-capacity (256 M) flexible disk 91, the type identifier hole 97 (K) or (256 M) is formed at a position farther from a write protection hole 35 than the large-capacity identifier hole 89 in the first embodiment.

In the first and the second embodiments described above, the case 87 or 95 of the large-capacity flexible disk 83 or 91 is provided with the large-capacity identifier hole 71 (L) or the type identifier hole 97 (K), which is for identifying the type of the large-capacity flexible disk, formed in the penetrating state in the vicinity of the write protection hole 35. In the first and the second embodiments described above, the large-capacity identifier hole 89 (L) is used as a 128-Mbyte identifier hole 89 (128 M) representative of the storage capacity of 128 Mbyte while the type identifier hole 97 (K) is used as a 256-Mbyte identifier hole 97 (256 M) representative of the storage capacity of 256 Mbyte.

Figure 8:
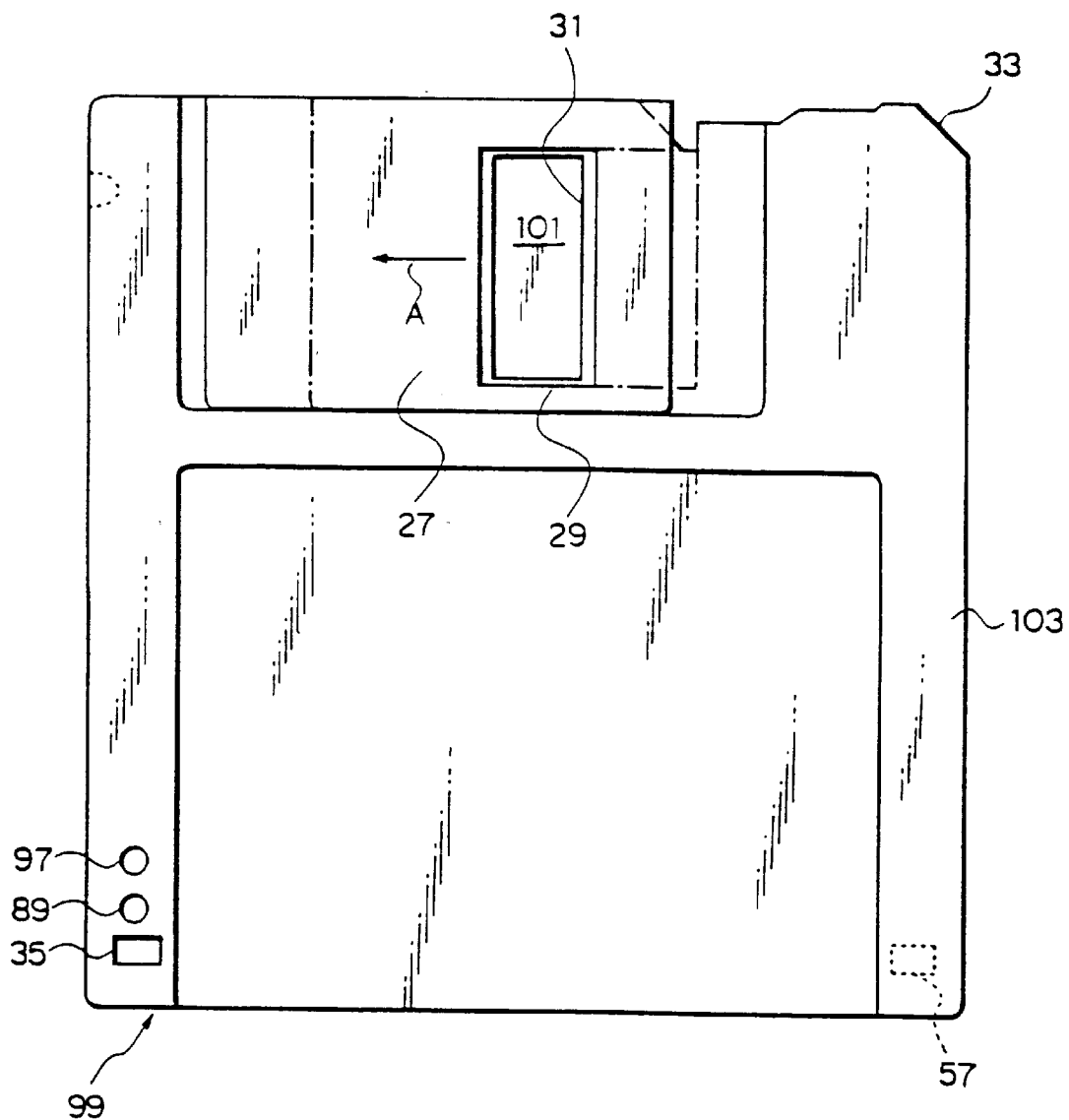
FIG. 8 is a plan view of a large-capacity flexible disk according to a third embodiment of this invention as seen from a front surface side.

Referring to FIG. 8, a large-capacity flexible disk 99 according to a third embodiment of this invention is similar in structure to the large-capacity flexible disk 83 according to the first embodiment illustrated in FIGS. 6A and 6B except that the type identifier hole 97 used in the first embodiment to identify the type of the large capacity flexible disk is selectively provided to the case 103.

As described in the first or the second embodiment, the type of the large-capacity flexible disk can be identified with reference to presence or absence of the type identifier hole 97. For example, in case of the large-capacity flexible disk having a storage capacity of 128 Mbyte, the case 103 is not provided with the type identifier hole 97. For the large-capacity flexible disk having a storage capacity of 256 Mbyte, the case 103 is provided with the type identifier hole 97.

In the third embodiment, the type identifier hole 97 is formed in the vicinity of the write protection hole 35 together with the large-capacity identifier hole 89.

It is possible to identify that the storage capacity is 512 Mbyte by providing both of the type identifier hole 97 and the large-capacity identifier hole 89.

Figure 9:
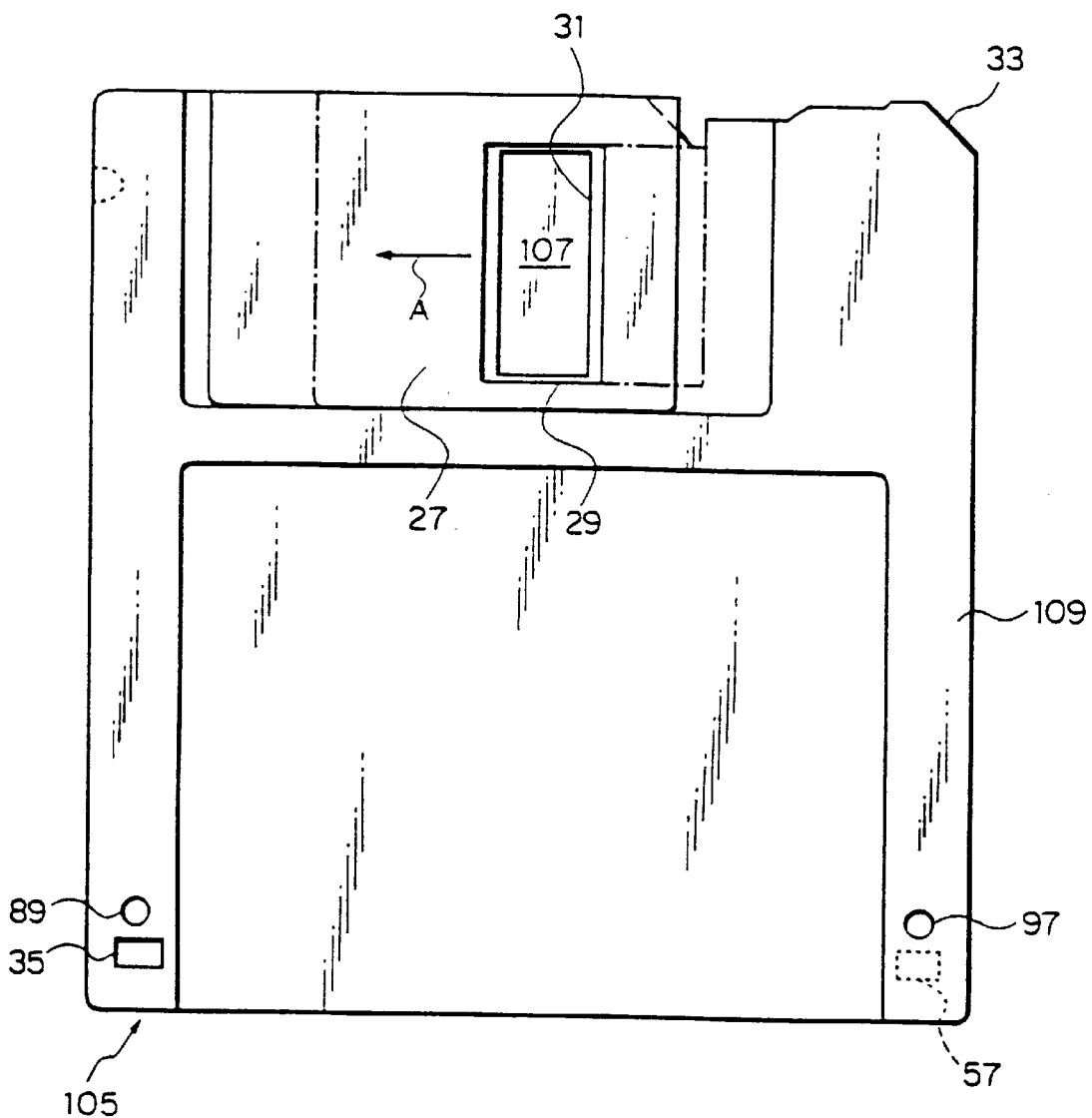
FIG. 9 is a plan view of a large-capacity flexible disk according to a fourth embodiment of this invention as seen from a front surface side.

Referring to FIG. 9, a large-capacity flexible disk 105 according to a fourth embodiment of this invention is similar in structure to the large-capacity flexible disk 99 illustrated in FIG. 8 except that the type identifier hole 97 is formed at a different position. Specifically, in the fourth embodiment, the type identifier hole 97 is formed in the vicinity of a small-capacity identifier hole 57.

The above-mentioned fourth embodiment is directed to the situation where two types of the storage capacities of 128 Mbyte and 258 Mbyte are involved. It is also possible to represent the storage capacity of 512 Mbyte in case where both the type identifier hole 97 and the large-capacity identifier hole 89 are formed.

Figure 10:
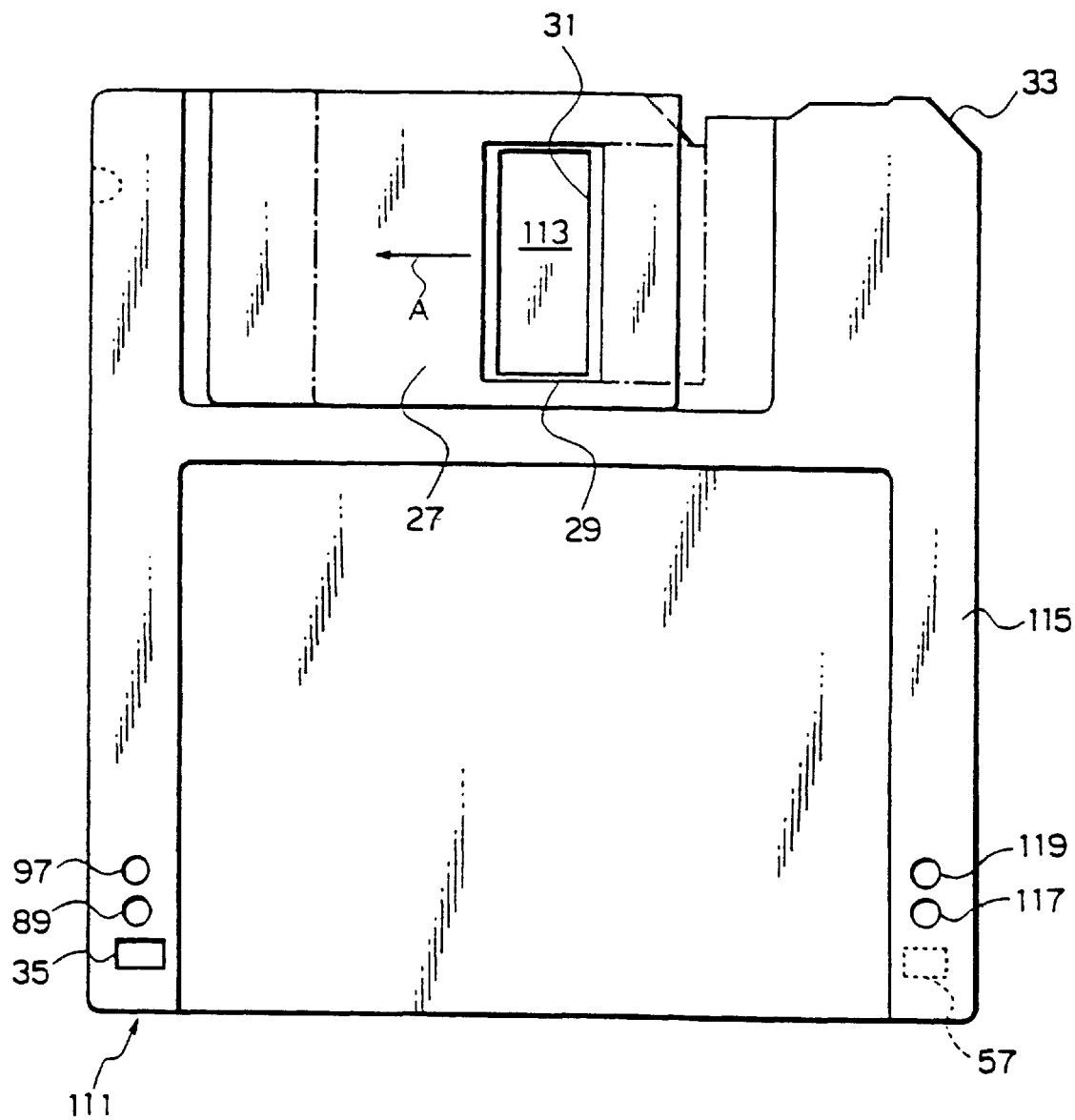
FIG. 10 is a plan view of a large-capacity flexible disk according to a fifth embodiment of this invention as seen from a front surface side.

Referring to FIG. 10, a large-capacity flexible disk 111 according to a fifth embodiment of this invention is directed to the situation where four types of the storage capacities are involved in the instance of FIG. 8 or 9. The illustrated large-capacity flexible disk 111 is similar in structure to the large-capacity flexible disk 99 illustrated in FIG. 8 except that a case 115 is further provided with type identifier holes 117 and 119 selectively formed to identify the type of the large-capacity flexible disk. The type of the large-capacity flexible disk can be identified with reference to presence or absence of the type identifier holes 117 and 119. For example, in case of the large-capacity flexible disk having a storage capacity of 128 Mbyte, the case 115 is provided with the large-capacity identifier hole 89 alone without the type identifier holes 97, 117, and 119. For the large-capacity flexible disk having a storage capacity of 256 Mbyte, the case 115 is provided with the type identifier hole 97 or 117 alone. For the large-capacity flexible disk having a storage capacity of 512 Mbyte, the case 115 is additionally provided with the type identifier hole 119. In this manner, it is possible to identify the storage capacities of eight types at maximum. In other words, it is possible to identify the type of the large-capacity flexible disk with reference to the number and the position of the type identifier holes.

In the fifth embodiment, the type identifier hole 97 is formed in the vicinity of the write protection hole 15 together with the large-capacity identifier hole 89. The other type identifier holes 117 and 119 are formed in the vicinity of the 2-Mbyte identifier hole 57.

As is obvious from the foregoing description, in the large-capacity flexible disk according to each of the first through the fifth embodiments of this invention, the case is provided with the large-capacity identifier hole (large-capacity identifier means) 89 for discriminating the large-capacity flexible disk from the small-capacity or the medium-capacity flexible disk. It is therefore possible to provide the large-capacity flexible disk which can be discriminated from the normal-capacity flexible disk.

In addition, by selectively providing the case with the type identifier holes 97, 117, and 119 to identify the type of the large-capacity flexible disk, it is possible to provide the large-capacity flexible disk enabling identification of the type of the large-capacity flexible disk with reference to the number and the position of the type identifier holes.

Figures 11A, 11B, 11C, 11D:
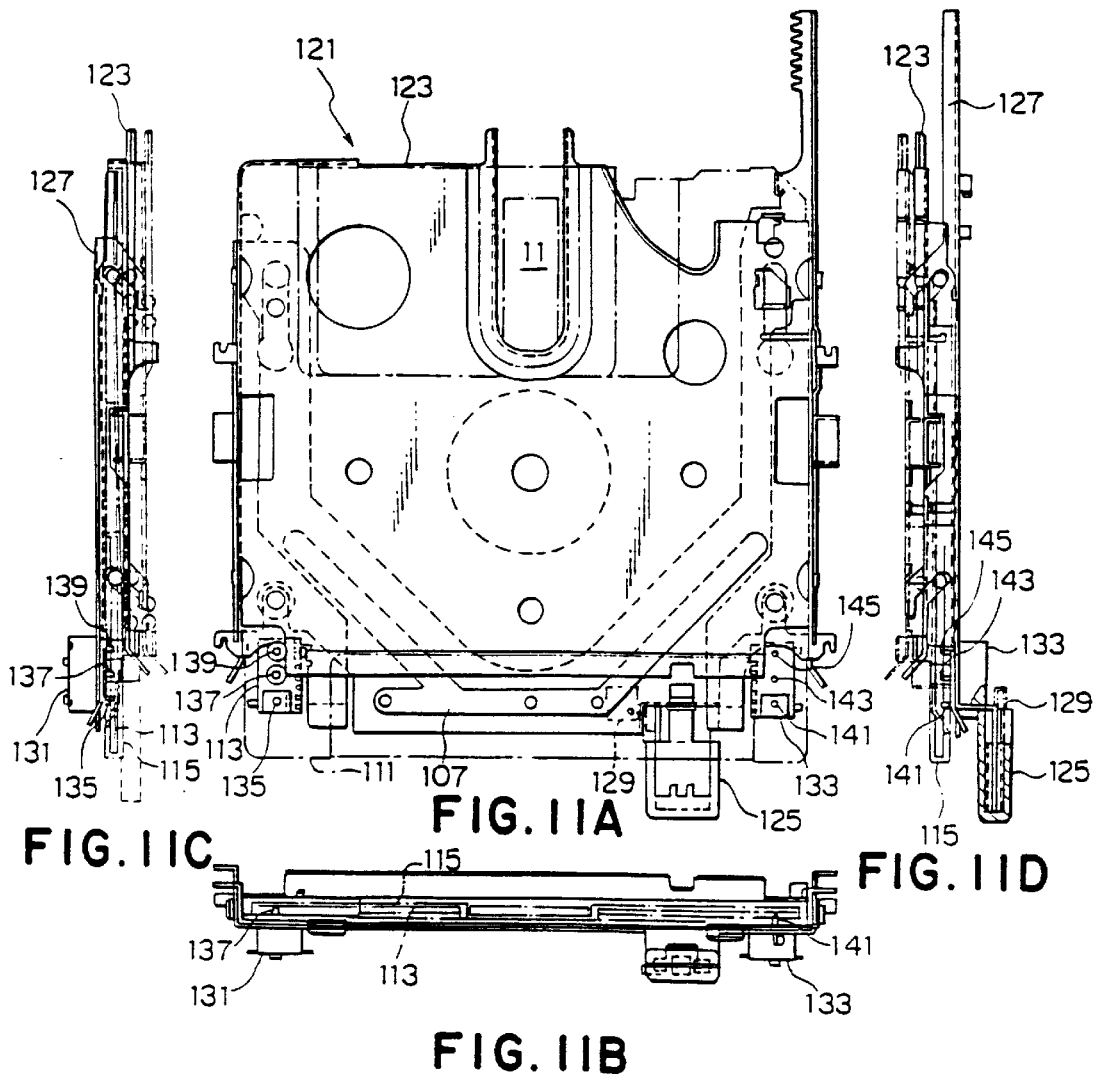
FIG. 11A is a plan view of a high-density type flexible disk drive according to one embodiment of this invention as seen from a front surface side.
FIG. 11B is a front view of the high-density type flexible disk drive in FIG. 11A.
FIG. 11C is a right side view of the high-density type flexible disk drive in FIG. 11A.
FIG. 11D is a left side view of the high-density type flexible disk drive in FIG. 11A.

Referring to a plan view in FIG. 11A, a front view in FIG. 11B, a left side view in FIG. 11C, and a right side view in FIG. 11D, description will be made about the high-density type flexible disk drive 121 according to an embodiment of this invention which can access the large-capacity flexible disks illustrated in FIGS. 6A, 6B, 7A, 7B, 8A, 8B, 9A, 9B, 10A, and 10B.

In this embodiment, the large-capacity flexible disk 111 illustrated in FIGS. 10A and 10B is used as the large-capacity flexible disk, although it is not restricted thereto.

The high-density type flexible disk drive 121 comprises a disk holder unit 123 holding the large-capacity flexible disk 111, and an eject button 125 for ejecting the large-capacity flexible disk inserted therein. A reference numeral 127 represents an eject plate while a reference numeral 129 represents an eject switch. The eject switch 129 produces a data write inhibit signal immediately after operating the eject button 125 and before an eject mechanism (not shown) actually starts its operation.

The high-density type flexible disk drive 121 further comprises first and second switch units 131 and 133 mounted on a printed circuit board (not shown) at left side and right side corners of a rearward end in an insertion direction, respectively. Each of the first and the second switch units 131 and 133 comprises a push switch.

The first switch unit 131 is for detecting the write protection hole 35, the large-capacity identifier hole 89, and the type identifier hole 97 of the large-capacity flexible disk. The second switch unit 133 is for detecting the 2-Mbyte identifier hole 57 and the type identifier holes 117 and 119.

More in detail, the first switch unit 131 comprises a write control switch 135 formed at a position corresponding to the write protection hole 35 to detect open and close states of the write protection hole 35, a large-capacity detecting switch 137 formed at a position corresponding to the large-capacity identifier hole 89 to identify and detect whether the inserted flexible disk is the large-capacity flexible disk or the small-capacity or the medium-capacity flexible disk, and a first type detecting switch 139 formed at a position corresponding to the type identifier hole 97 to detect presence or absence of the type identifier hole 97.

On the other hand, the second switch unit 133 comprises a small-capacity detecting switch 141 formed at a position corresponding to the 2-Mbyte identifier hole 57 to identify and detect whether the inserted flexible disk has 1 Mbyte or 2 Mbyte, and second and third type detecting switches 143 and 145 formed at positions corresponding to the type identifier holes 117 and 119 to detect presence or absence of the type identifier holes 117 and 119, respectively.

In response to on/off conditions of the write control switch 135, write permission/inhibition to the large-capacity flexible disk is carried out. If the small-capacity detecting switch 141 detects the presence of the 2-Mbyte identifier hole 57, the inserted flexible disk is identified as the small-capacity flexible disk of 2 M. Upon detection of absence of the 2-Mbyte identifier hole 57, the inserted flexible disk is identified as the small-capacity flexible disk of 1 M. If the large-capacity detecting switch 137 detects the presence of the large-capacity identifier hole 89, the inserted flexible disk is identified as the large-capacity flexible disk. Upon detection of absence of the large-capacity identifier hole 89, the inserted flexible disk is identified as the small-capacity flexible disk. With reference to the on/off conditions of the first through the third type detecting switches 139, 143, and 145, it is possible to identify eight types of storage capacities at maximum.

In the foregoing embodiment, use is made of a push switch as each of the first and the second switch units 131 and 133. Alternatively, a different switch such as an optical switch may be used. In the foregoing embodiment, the write control switch 135, the large-capacity detecting switch 137, and the first type detecting switch 139 are integrally formed into the first switch unit 131 while the small-capacity detecting switch 141 and the second and the third type detecting switches 143 and 145 are integrally formed into the second switch unit. Alternatively, these switches may be formed as separate components.

It will readily be understood that this invention is not restricted to the foregoing embodiments and various modifications and changes can be made within the scope not deviated from the gist of this invention.

As is obvious from the foregoing description, the high-density type flexible disk drive according to the embodiment of this invention has the large-capacity detecting switch (large-capacity identifying means) at the position corresponding to the large-capacity identifier hole (large-capacity identifying and discriminating means) 89 for discriminating the large-capacity flexible disk from the small-capacity or the medium-capacity flexible disk. Therefore, it is readily possible to identify whether the inserted flexible disk is the normal-capacity flexible disk or the large-capacity flexible disk.

In the event that the case is further provided with the type identifier holes 97, 117, and 119 selectively formed to identify the type of the large-capacity flexible disk so that the type of the large-capacity flexible disk can be identified with reference to the number and the position of the type identifier holes, the type detecting switches are provided at the positions corresponding to the type identifier holes 97, 117, and 119. Thus, it is possible to identify the type of the large-capacity flexible disk inserted therein.

Figure 12A:
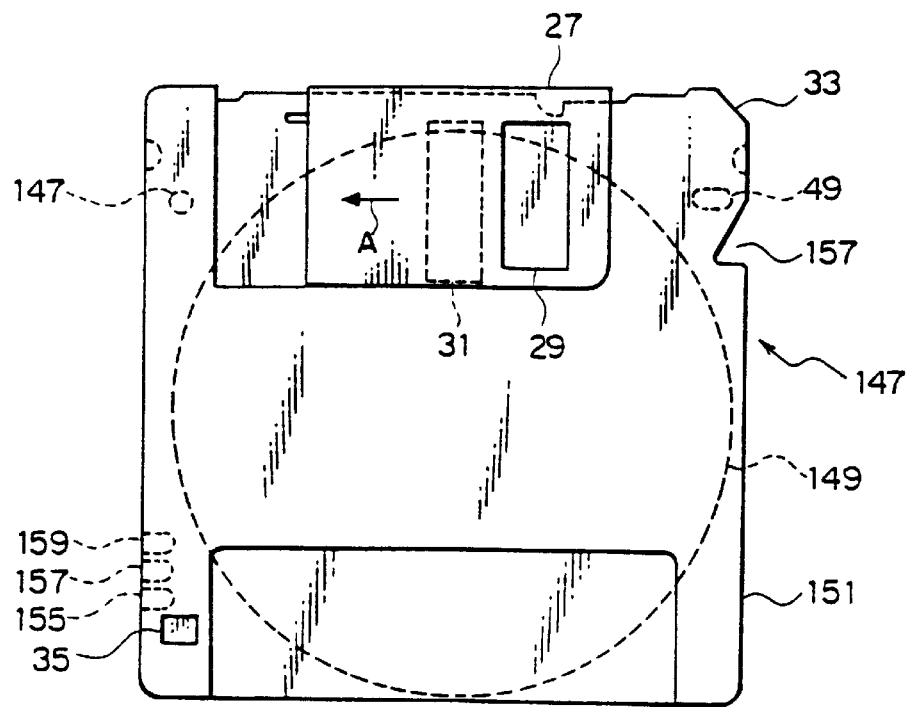
FIG. 12A is a plan view of a large-capacity flexible disk according to a sixth embodiment of this invention as seen from a front surface side.
Figures 12B, 12C:
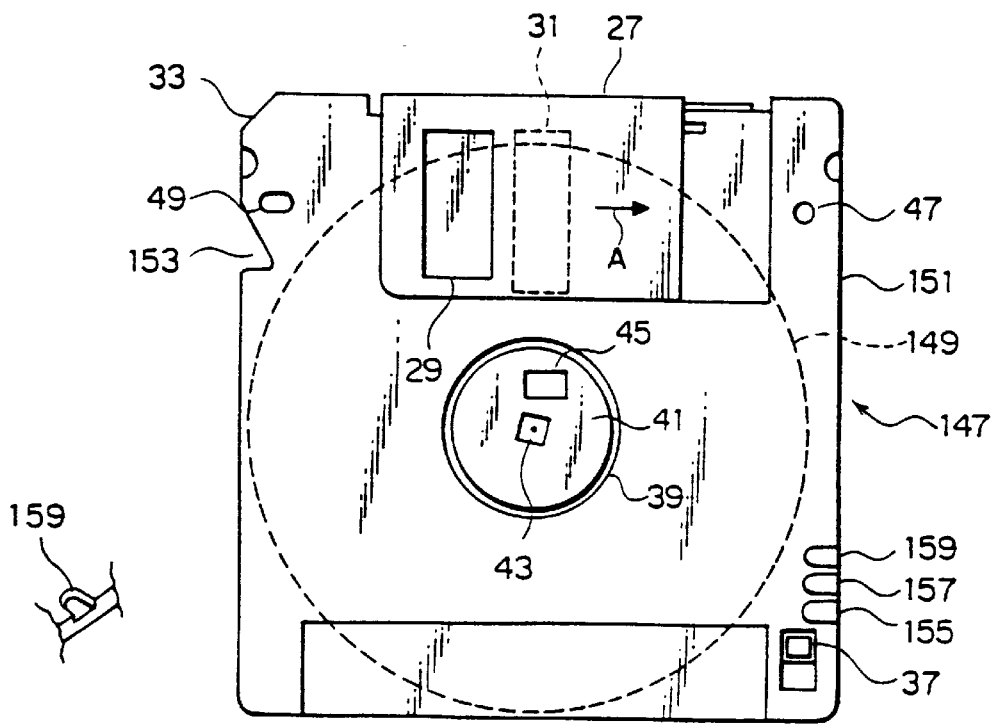
FIG. 12B is a bottom view of the large-capacity flexible disk in FIG. 12A as seen from a rear surface side.
FIG. 12C is an enlarged perspective view of a part cut out from FIG. 12B.

Referring to FIGS. 12A, 12B, and 12C, description will be made about a large-capacity flexible disk according to a sixth embodiment of this invention. FIG. 12A is a plan view as seen from a front surface side (called a side 1), FIG. 12B is a bottom view as seen from a rear surface side (called a side 0), and FIG. 12C is an enlarged perspective view of only a part cut out from FIG. 12B. The large-capacity flexible disk 147 illustrated in the figure is an example where the number of types of storage capacities is given by $(2^3-1)=7$, including 128 Mbyte, 256 Mbyte, 512 Mbyte, 1024 Mbyte, 2048 Mbyte, 4096 Mbyte, and 8192 Mbyte.

The large-capacity flexible disk 147 comprises a disk-shaped magnetic disk medium 149, a case 151 covering the magnetic disk medium 149, and a shutter 27 slidable in a direction of an arrow A in the figures. A shutter window 29 is formed in the shutter 27. The shutter 27 is urged by a spring member not illustrated in the figures in a direction reverse to the direction of the arrow A. When the shutter 27 slides in the direction of the arrow A, the shutter window 29 of the shutter 27 is located above a head window 31 of the case 151 so that the magnetic disk medium 149 is accessible through the head window 31 by a magnetic head (not shown) of a high-density type flexible disk drive.

The case 151 has a flat rectangular shape having a width, a length, and a thickness substantially equal to 90 mm, 94 mm, and 3.3 mm, respectively. The case 151 is provided with a chamfered portion 33 formed at a right corner of a forward end in an insertion direction to prevent reverse insertion (insertion with upside down and forward side back). A write protection hole (write inhibition hole) 35 is formed at a left side corner of a rearward end in the insertion direction. As illustrated in FIG. 12B, a write protection tab 37 slidable in the insertion direction is formed on a rear surface of the case 151 at a position corresponding to the write protection hole 35. By manually operating the write protection tab 37, the write protection hole 35 can be opened and closed. When the write protection hole 35 is closed by the write protection tab 37, a recordable state is established. When the write protection hole 35 is opened, an unrecordable state is insured.

At a rear surface side (side 0) of the case 151, a circular-shaped hub operation hole 39 is formed at its center, as illustrated in FIG. 12B. In the hub operation hole 39, a disk hub 41 holding the magnetic disk medium 149 is loosely fitted. The disk hub 41 is provided with a disk center hole 43 formed at its center to loosely fit a spindle shaft (not shown) of a spindle motor, and a chucking hole 45 formed at a peripheral position offset from the disk center hole 43 to loosely fit a chucking pin (not shown) of the spindle motor.

Furthermore, at the rear surface side (side 0) of the case 151, first and second reference holes 47 and 49 are formed at opposite sides frontward in the insertion direction to be used for positioning, when the large-capacity flexible disk 147 is inserted and received in the high-density type flexible disk-drive (not shown), the large-capacity flexible disk 147 in a height direction and in forward, backward, leftward, and rightward directions with respect to the high-density type flexible disk drive. The first reference hole 47 is a circular hole while the second reference hole 49 is an elongated hole extending in a direction perpendicular to the insertion direction.

At a lateral side on which the chamfered portion 33 is formed, the case 151 is provided with an insertion error preventing notch 153 formed at such a position and having such a shape as to be engageable with a reverse insertion preventing lever (not shown) of a dedicated low-density or a dedicated medium-density flexible disk drive.

In the illustrated sixth embodiment, the case 151 is provided with first through third large-capacity identifier notches 155, 157, and 159 selectively formed at one lateral edge to discriminate the large-capacity flexible disk 147 from other flexible disks (the small-capacity flexible disk and the medium-capacity flexible disk). In the illustrated example, the first through the third large-capacity identifier notches 155, 157, and 159 are formed in the vicinity of the write protection hole 35. As illustrated in FIG. 12C, the first through the third large-capacity identifier notches 155, 157, and 159 are formed only at a lower (bottom) side of the case 151 and have a depth of, for example, 2.5 mm. In other words, the first through the third large-capacity identifier notches 155, 157, and 159 do not penetrate but are bottomed.

Although not shown, the high-density type flexible disk drive has a large-capacity detecting switch formed at a position corresponding to the first through the third large-capacity identifier notches 155, 157, and 159 to identify and detect whether an inserted flexible disk is the large-capacity flexible disk 147 or other flexible disk. Specifically, when the large-capacity detecting switch detects presence of at least one of the first through the third large-capacity identifier notches 155, 157, and 159, the inserted flexible disk is identified as the large-capacity flexible disk 147. Upon detection of none of the first through the third large-capacity identifier notches 155, 157, and 159, the inserted flexible disk is identified as the flexible disk other than the large-capacity flexible disk 147. As the large-capacity detecting switch, use may be made of a push switch or an optical switch.

The first through the third large-capacity identifier notches 155, 157, and 159 illustrated in the figures are selectively formed to identify the type of the large-capacity flexible disk 147. Thereby, as will be described in detail in the following, the type of the large-capacity flexible disk 147 can be identified with reference to the number and the position of the first through the third large-capacity identifier notches 155, 157, and 159.

For example, in the large-capacity flexible disk having a storage capacity of 128 Mbyte, the case 151 is provided with the first large-capacity identifier notch 155 alone. In the large-capacity flexible disk having a storage capacity of 256 Mbyte, the case 151 is provided with the second large-capacity identifier notch 157 alone. In the large-capacity flexible disk having a storage capacity of 512 Mbyte, the case 151 is provided with the first and the second large-capacity identifier notches 155 and 157. In the large-capacity flexible disk having a storage capacity of 1024 Mbyte, the case 151 is provided with the third large-capacity identifier notch 159 alone. In the large-capacity flexible disk having a storage capacity of 2048 Mbyte, the case 151 is provided with the first and the third large-capacity identifier notches 155 and 159. In the event that the large-capacity flexible disk having a storage capacity of 4096 Mbyte, the case 151 is provided with the second and the third large-capacity identifier notches 157 and 159. In the large-capacity flexible disk having a storage capacity of 8192 Mbyte, the case 151 is provided with the first through the third large-capacity identifier notches 155, 157, and 159.

Thus, by selectively forming the three large-capacity identifier notches 155, 157, and 159 at the one lateral edge of the case 15, the large-capacity flexible disks of $(2^3-1)=7$ types can be identified.

It will be understood that this invention is not restricted to the foregoing embodiment and various modifications and changes can be made within a scope not deviated from the gist of this invention. For example, although the case is provided with the large-capacity identifier notches 155, 157, and 159, three in number, in the foregoing embodiment, at least one large-capacity identifier notch is sufficient. The positions where the large-capacity identifier notches 155, 157, and 159 are formed are not restricted to the vicinity of the write protection hole 35 but may be any position on the one lateral edge of the case 151 as far as the magnetic disk medium 149 is not present. Furthermore, the large-capacity identifier notches 155, 157, and 159 are not restricted to bottomed ones but may penetrate. The large-capacity identifier notches may have any shape as desired.

As is obvious from the foregoing description, in the large-capacity flexible disk 147 according to the sixth embodiment of this invention, the case 151 is provided with at least one large-capacity identifier notches 155, 157, and 159 formed at the one lateral edge to discriminate the large-capacity flexible disk from other flexible disks. Therefore, it is possible to provide the large-capacity flexible disk which can be discriminated from other flexible disks. By selectively providing the case 151 with a plurality of the large-capacity identifier notches 155, 157, and 159, it is also possible to provide the large-capacity flexible disk enabling identification of the type of the large-capacity flexible disk with reference to the number and the position of the large-capacity identifier notches. Since a narrow area is sufficient to form the identifier notches 155, 157, and 159 as compared with the identifier holes, a large number of the large-capacity identifier holes can be formed. Therefore, it is possible to provide the large-capacity flexible disk enabling identification of a large number of types of the storage capacities.

What is claimed is:

1. A high-density flexible disk drive capable of accessing a large-capacity flexible disk having a case accommodating a magnetic disk medium, wherein said case is provided with a small-capacity identifier hole, a write protection hole and a plurality of large-capacity identifier holes, with at least one of said large-capacity holes being formed in a vicinity of the write protection hole for distinguishing said large-capacity flexible disk from a small-capacity or a medium-capacity flexible disk, wherein said high-density flexible disk drive comprises a large-capacity detecting switch provided at a position corresponding to said at least one of said large capacity identifier holes that is formed in the vicinity of the write protection hole for detecting said at least one of said large-capacity identifier holes when said large-capacity flexible disk is inserted into said high-density flexible disk drive, and wherein said high-capacity flexible disk drive further comprises a write control switch, integrally formed with said large-capacity detecting switch in a single unit, that detects opened and closed states of said write protection hole.

\* \* \* \* \*

UNITED STATES PATENT AND TRADEMARK OFFICE
CERTIFICATE OF CORRECTION

PATENT NO. : 6,239,950 B1  
DATED : May 29, 2001  
INVENTOR(S) : Tsuneo Uwabo et al.

It is certified that error appears in the above-identified patent and that said Letters Patent is hereby corrected as shown below:

<u>Title page,</u>
Item [75], Inventors, after "Atsugi" insert --; Yoshiniro Tangi, Hachiouji-shi --;
Item [30], Foreign Application Priority Data, change "Mar. 26, 1996" to -- June 26, 1996 --;

<u>Column 12,</u>
Line 36, change "15" to -- 151 --.

Signed and Sealed this

Tenth Day of December, 2002

JAMES E. ROGAN
*Director of the United States Patent and Trademark Office*